United States Patent [19]

Shimozono

[11] Patent Number: 4,665,335
[45] Date of Patent: May 12, 1987

[54] SMALL-SIZED SYNCHRONOUS MOTOR WITH SPECIFIC STATOR COIL LENGTH TO STATOR COIL RADIUS RATIOS

[75] Inventor: Shigeru Shimozono, Tokyo, Japan

[73] Assignee: Seikosha Co., Ltd., Tokyo, Japan

[21] Appl. No.: 876,919

[22] Filed: Jun. 20, 1986

[30] Foreign Application Priority Data

Jun. 20, 1985 [JP] Japan .................................. 60-134920

[51] Int. Cl.$^4$ ............................................ H02K 19/00
[52] U.S. Cl. .............................. 310/163; 310/40 MM; 310/49 R; 310/154
[58] Field of Search ............ 310/40 R, 40 MM, 49 R, 310/162, 163, 254, 164, 165, 190–193, 156

[56] References Cited

U.S. PATENT DOCUMENTS 4,012,899  3/1977  Matsuura et al. ........ 310/40 MM X
4,205,244  5/1980  Fukushima ..................... 310/49 R
4,297,838  11/1981  Watanabe et al. ....... 310/40 MM X Primary Examiner—Mark O. Budd
Attorney, Agent, or Firm—Bruce L. Adams; Robert E. Burns; Emmanuel J. Lobato

[57] ABSTRACT

A small synchronous motor is provided with a stator winding wound around a stator core. Conversion efficiency is improved by setting the ratio of the coil length (L) to the thickness between the center of the core and the outer most periphery of the coil (R) to be L/R to 40.

2 Claims, 8 Drawing Figures

SMALL-SIZED SYNCHRONOUS MOTOR WITH SPECIFIC STATOR COIL LENGTH TO STATOR COIL RADIUS RATIOS

BACKGROUND OF THE INVENTION

1. Industrial Field of the Invention

The present invention relates to a highly-effective small-sized synchronous motor suitable for use in a crystal clock or the like.

2. Prior Art

Recently, attempts have been made to lower the current consumption of crystal clocks. In Japanese Patent Laid-Open No. 129970/1975, for example, this is conducted from the viewpoint of the dimensional ratio between a stator and rotor, by setting it to a value within a predetermined range.

Problems to be Solved by the Invention

In the synchronous motor disclosed in the above-mentioned specification, the dimensional ratio of the stator and rotor is set to an optimum value. Even if an improvement has been made in this point, however, it is still impossible to obtain a sufficient efficiency, and the conversion efficiency of a conventional crystal clock remains at an extremely low level of 20% or less.

An object of the present invention is to provide a highly-efficient synchronous motor.

DETAILED DESCRIPTION OF THE INVENTION

Figures 1, 2:
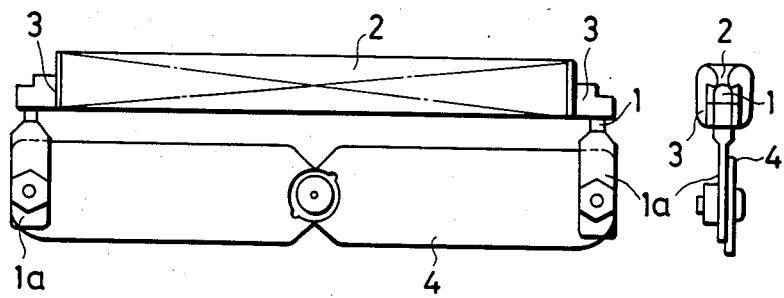
FIG. 1 is a front view of an embodiment of the present invention.
FIG. 2 is a side view of the synchronous motor of FIG. 1, as seen from the right side.
Figure 3:
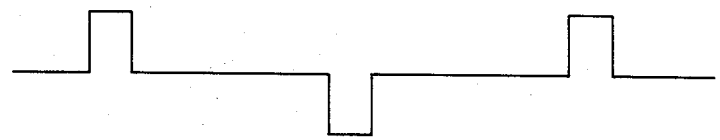
FIG. 3 shows the waveform of driving pulses.

Referring first to FIGS. 1 and 2, reference numeral 1 denotes a bar-shaped core having a circular cross-sectional configuration, around which a coil 2 is directly wound. Each end of the wound coil 2 is clamped by means of a plastic coil frame 3. Each end 1a of the core 1 is flattened by a press. The core 1 and a stator 4 are magnetically connected by screwing together both ends 1a, 1a and both ends of the stator 4, respectively. Reference numeral 5 designates a rotor made, for example, of SmCo. Positive and negative pulses, such as shown in FIG. 3, are alternately supplied to the coil 2 of the motor so that the rotor is rotated by 180 degrees at a time.

Figures 4, 5:
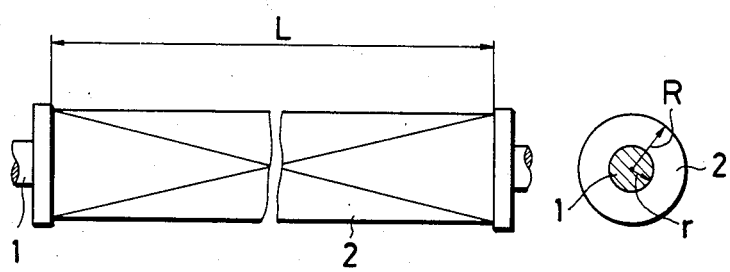
FIG. 4 is a fragmentary front view of the essential parts of FIG. 1.
FIG. 5 is a side view as seen from the right side of FIG. 4.
Figure 6:
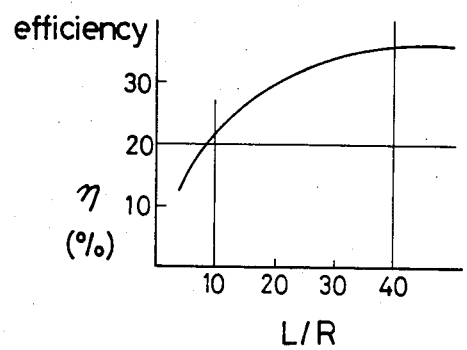
FIG. 6 shows the relationship between the ratio $L/R$ and the conversion efficiency.

In the thus-arranged motor, it has been confirmed by experiments that the conversion efficiency $\eta$ varies with changes in the ratio of the length L of the core 1 around which the coil 2 is wound and the thickness R between the core center and the outermost periphery of the coil, as shown in FIGS. 4 and 5. More specifically, as shown in FIG. 6, if the ratio $L/R$ is at least 10, the conversion efficiency becomes at least 20%.

If the ratio $L/R$ is made very large, the process of winding the wire becomes technically difficult, increasing the production cost. With a very long L, the magnetic reluctance increases, and also the leakage of magnetic flux increases. This is not good for a magnetic circuit, and also goes against the principle of a compact motor and is disadvantageous from the structural viewpoint.

If the radius of the core is too small, the magnetic paths may become saturated.

From the foregoing description, it can be understood that the optimum value of this ratio is with the range of $10 \leq L/R \leq 40$.

As shown in FIG. 6, the conversion efficiency does not improve when the ratio $L/R$ is above 40, so that larger ratios produce no advantages. When the ratio $L/R$ is less than 10, the winding becomes thick, thereby increasing the winding resistance. In such a case, the wire turns are not used efficiently, so that the conversion efficiency drops.

Figure 7:
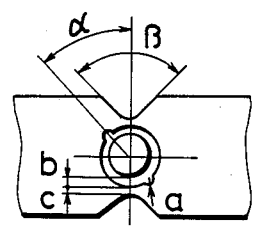
FIG. 7 shows the specifications of a stator and a rotor which were employed in experiments.

The characteristics shown in FIG. 6 were obtained from experiments conducted with a motor having the specifications shown in the table below. The air gap, connection margin and expansion angle given in the table are shown in FIG. 7.

The stator and rotor may have any specifications. The most effective magnetic flux can be obtained from the core by setting the ratio $L/R$ to the above-described range.

| Item | Specifications |
| --- | --- |
| Rotor | |
| Material | SmCo |
| Diameter | 3.0 mm |
| Thickness | 1.2 mm |
| Stator | |
| Material | 78 Permalloy |
| Notch angle ($\alpha$) | 45° |
| Notch radius (a) | 0.3 mm |
| Air Gap (b) | 0.7 mm |
| Connection margin (c) | 0.1 mm |
| Expansion angle ($\beta$) | 90° |
| Coil | |
| Material | Polyurethane Wire |
| Diameter | 0.05 mm |
| Number of Turns | 12000 T |
| Resistance | 850 ohms |
| IC | |
| Pulse Width | 13.7 msec |
| Rout | 80 ohms |

Figure 8:
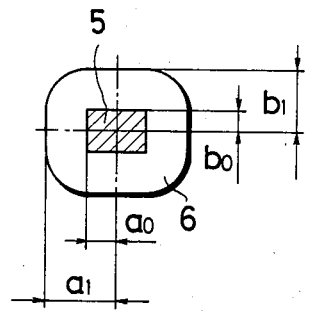
FIG. 8 is a cross-sectional view of another example of a core.

The cross-sectional configuration of the core is not limited to a circular one: a core 5 having, for example, a rectangular cross-section, as shown in FIG. 8, may also be employed. In such a case, the cross-sectional configuration of a coil 6 is not circular either, and the thickness R from the center of the core 5 to the outermost periphery of the coil is represented by half the sum of the thickness $a_1$ and $b_1$ between the core center and the outermost periphery.

A core of a square, elliptical, or other cross-sectional configuration may also be used, in addition to those having the above-mentioned cross-sectional shapes. In any of these cases, the thickness R from the core center to the outermost periphery of the coil is calculated in a similar manner to that in the case of the rectangular configuration.

It is preferable for the ratio R/r between R and the radius r of the core to be set at 1.5 or more, because, if the coil winding thickness is very small with respect to the core radius, the length of the core around which the coil is wound must be made longer in order to obtain the necessary ampere-turns, making the overall size of the motor larger. In a core having a rectangular cross-section, the radius r of the core is represented by half the sum of half $a_0$ of the length of the long side and half $b_0$ of the length of the short side. The radius of a core having a square or elliptical cross-section is calculated in a similar manner.

When the synchronous motor of the present invention is used in a clock, it is preferable for the length L of the core about which the coil is wound to be 30 mm or more. Since a clock has large hands and is not sealed tightly, it is possible that the clock could be stopped by dust, and it is therefore necessary to have a larger output torque. In order to fulfill the condition $10 \leq L/R \leq 40$ when L is 30 mm or less, R must be set at 3 mm or less. With the thickness set in this way, it is very difficult to obtain a high output torque at a high conversion efficiency. In other words, to obtain a high torque with a low current consumption, the current of the ampere-turns must be lowered, and the number of turns is correspondingly increased. In so doing, if L is too short, the number of turns must be made larger by making the core thinner. If the core is made thinner, however, the coil is magnetically saturated, lowering its efficiency. Therefore, L cannot be made very short. In a clock, a desirable value is 30 mm or more. A very long length goes against the principle of a small-sized motor, thus determining the upper limit of the length L. According to experiments the inventors have conducted, it has been found most suitable to have L, R and r set at 42 mm, 3.7 mm and 1.5 mm, respectively.

In the above-described embodiment, the description is made of a coil wound directly onto a core. A coil bobbin which has a core inserted therein and about which the coil is wound may also be employed.

The coil and stator employed in the above embodiment are separate members and are screwed together, but the core and stator may alternatively be formed integrally.

The synchronous motor of the present invention may also be used in a device such as a timer.

Effects of the Invention

According to the present invention, since the ratio of the length L of a core about which a coil is wound and the thickness R from the center of the core to the outermost periphery of the coil is set at $10 \leq L/R \leq 40$, it is possible to obtain a high output at a low current consumption, thereby making it possible to obtain a highly-efficient motor.

In particular, when the synchronous motor of the present invention is employed in a clock, it is possible to obtain the necessary output torque at a low current consumption by setting L at 30 mm or more, enabling the clock to have a long life.

What is claimed is:

1. A small-sized synchronous motor including: a stator having spaced-apart magnetic poles and being magnetically connected to both sides of a core around which is wound a coil, and a rotor rotatably disposed between the magnetic poles of said stator, wherein the length L of said core around which said coil is wound and the thickness R between the center of said core and the outermost periphery of said coil satisfy the relation $10 \leq L/R \leq 40$.

2. A small-sized synchronous motor according to claim 1, wherein the length L of said core around which said coil is wound is 30 mm or more.

* * * * *